(12) United States Patent
Murphy et al.

(10) Patent No.: US 7,778,751 B2
(45) Date of Patent: Aug. 17, 2010

(54) METHOD AND APPARATUS FOR MONITORING THE STATUS OF AUTOMOTIVE SERVICE EQUIPMENT AND SIGNALING THE STATUS BY A WIRELESS TECHNOLOGY TO THE OPERATOR

(75) Inventors: Jeffrey B. Murphy, Millersville, PA (US); Eric I. Shultz, Mount Joy, PA (US); Thomas L. Crandall, York, PA (US)

(73) Assignee: RTI Technologies, Inc., York, PA (US)

( * ) Notice: Subject to any disclaimer, the term of this patent is extended or adjusted under 35 U.S.C. 154(b) by 423 days.

(21) Appl. No.: 11/797,165

(22) Filed: May 1, 2007

(65) Prior Publication Data

US 2008/0275605 A1 Nov. 6, 2008

(51) Int. Cl.
*G01M 17/00* (2006.01)
(52) U.S. Cl. .............................. 701/33; 701/29; 701/36; 340/438; 340/439; 340/426.16
(58) Field of Classification Search ................... 701/29, 701/30, 33, 36; 340/425.5, 426.16, 426.18, 340/438, 439
See application file for complete search history.

(56) References Cited

U.S. PATENT DOCUMENTS

| | | |
|---|---|---|
| 4,333,491 A | 6/1982 | Knubley |
| 4,456,038 A | 6/1984 | Gwaltney et al. |
| 4,582,108 A | 4/1986 | Markow et al. |
| 5,611,875 A | 3/1997 | Bachhuber |
| 6,029,508 A | 2/2000 | Schoenbeck et al. |
| 6,732,028 B2 | 5/2004 | Vanstory et al. |
| 6,822,582 B2 | 11/2004 | Voeller et al. |
| 6,826,532 B1 | 11/2004 | Casby et al. |
| 6,982,653 B2 | 1/2006 | Voeller et al. |
| 7,099,749 B2 | 8/2006 | Voeller |
| 7,152,636 B2 | 12/2006 | Petty |

*Primary Examiner*—Gertrude Arthur Jeanglaud
(74) *Attorney, Agent, or Firm*—Antonelli, Terry, Stout & Kraus, LLP.

(57) ABSTRACT

Automotive service equipment and method of servicing an automotive vehicle use an automotive service machine having at least one automatic mode of operation during which an operator is not required to be present. A first, stationary communication module connected to the service machine receives first signals from the machine indicating the status of an automatic mode of operation of the machine and wirelessly transmits second signals communicating when an operator's attention to the machine is required. A second, portable communication module remotely receives the second signals and in response activates a signaling device in the second module for signaling an operator that attention to the machine is required. Thereby, during vehicle servicing the operator can perform other tasks within the workshop, thus being more productive and efficient.

21 Claims, 3 Drawing Sheets

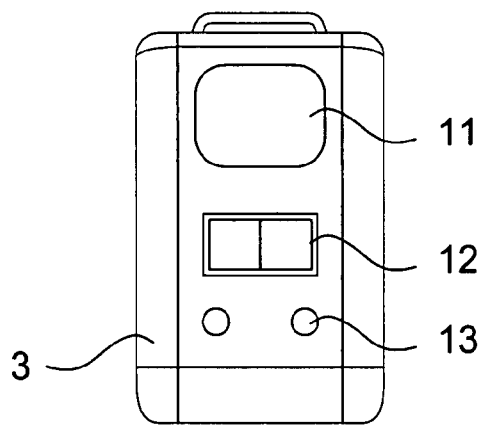
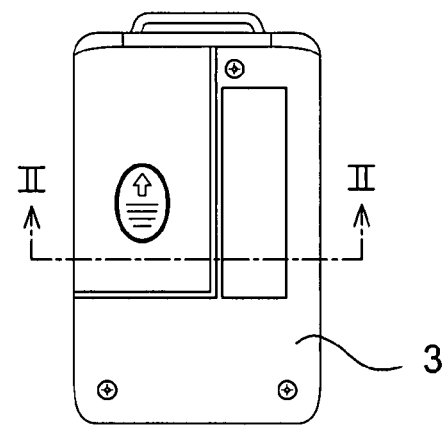
Figure 2A
Figure 2B
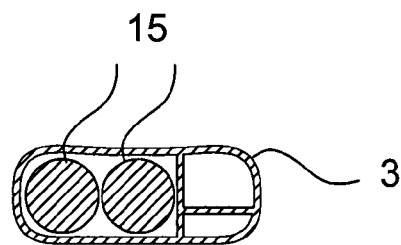
Figure 2C

METHOD AND APPARATUS FOR MONITORING THE STATUS OF AUTOMOTIVE SERVICE EQUIPMENT AND SIGNALING THE STATUS BY A WIRELESS TECHNOLOGY TO THE OPERATOR

TECHNICAL FIELD

The invention relates to automotive service equipment and its use wherein an automotive service machine for servicing a vehicle has at least one automatic mode of operation in which a plurality of process steps are automatically performed sequentially by the machine, each step requiring various lengths of time for completion and wherein an operator is not required to be present during those periods of time.

BACKGROUND AND SUMMARY

Automotive service equipment is rapidly being advanced to incorporate more and more automatic modes of operation. Several steps within each service procedure occur sequentially, each step requiring various lengths of time for completion. The operator is not required to be present at the service equipment during these periods of time. He can be performing other tasks within the workshop, thus being more productive and efficient.

A purpose of the present invention is to provide an improved automotive service equipment and method employing an automotive service machine having at least one automatic mode of operation for servicing a vehicle as referred to above, which provides a means to communicate service equipment status to the operator while he is away from the service equipment during automatic service procedures. The automotive service equipment of the inventions signals the operator at the time his intervention is required. Completion of an automatic sequence, or an operation fault condition, or that a process input is required, can be communicated.

In a disclosed embodiment, the automotive service equipment of the invention comprises an automotive service machine having at least one automatic mode of operation for servicing a vehicle during which an operator is not required to be present. A first, stationary communication module is connected to the automotive service machine. The first communication module receives first signals from the machine indicating the status of an automatic mode of operation of the machine and wirelessly transmits second signals communicating when an operator's attention to the machine is required. A second, portable communication module remotely receives the second signals and in response activates a signaling device in the second communication module for signaling an operator that attention to the machine is required.

According to the example embodiment, the second signals are wirelessly transmitted by the first communication module when at least one of a process input is required, a process is halted due to an operation fault condition, and a process is completed. Preferably, the second, portable communication module is a pocket-size module for carrying by an operator, e.g. worn around the neck by way of a lanyard, fastened to a belt by way of belt clip or attached to a keychain. Because the range of communication possible between the first and second communication modules extends beyond the immediate vicinity of the automotive service machine, the operator can, after initial setup of the automotive service machine, leave the immediate vicinity of the machine and perform other tasks within the workshop, thus being more productive and efficient, while being immediately notified when attention to the automatically operating machine is required.

A controller of the automotive service machine for operating the machine in the at least one automatic mode of operation sends the first signals from the machine to the first communication module. The first communication module may be embedded within the controller or installed in the machine as a separate modular unit via a cable with plug connector at a communication port of the controller. The automotive service equipment includes means permitting the operator to selectively activate/deactivate the first communication module at the machine.

The automotive service equipment can additionally include a workshop management computer system as a central monitoring station to facilitate workshop management. In such case, the first communication module wirelessly transmits signals to and receives wirelessly transmitted signals from the workshop management computer system. Two-way communication can also be provided between the first and second communication modules to permit the second, portable communication module to indicate, for example, that it is out of range.

According to another feature of the automotive service equipment of the invention, a plurality of automotive service machines each having at least one automatic mode of operation, are provided. A plurality of first communication modules each connected to a respective one of the automotive service machines receive first signals from their associated machine indicative of the status of an automatic mode of operation of the machine and wirelessly transmit second signals when an operator's attention to the machine is required. With this arrangement, the second, portable communication module receives the second signals from each of the first communication modules and in response signals an operator that attention to the machine is required. This permits one operator to monitor the operation of several machines at once. Alternatively, each machine can have its own dedicated second, portable communication module. The plurality of automotive service machines may include different types of automotive service machines such as fluid handling machines for power steering fluid exchange, differential fluid exchange, engine oil system flush, engine coolant exchange, air conditioner refrigerant charging/recovery/recycling, air conditioner flush, transmission fluid handling, brake fluid exchange, and nitrogen tire filling.

The portable module can be provided as part of a complete service equipment system from the factory. The portable module, in this example, would be synchronized with the stationary module mounted within the specific piece of service equipment. The portable module would, however, be able to be resynchronized with any other piece of service equipment containing an integral stationary module. Any portable module can be synchronized with any other stationary module. A single portable module may be synchronized with more than one piece of service equipment. This synchronization with one or many pieces of equipment is a function easily performed by the technician in the field at any time in the life of the product. A single portable module can be re-synchronized many times and in different combinations of monitored stationary modules as desired.

The invention can be retrofitted to any existing equipment which has a "means to alert" the technician that a process is complete or that his input is required. The "means to alert" in the existing equipment may be an indicator light or a buzzer for example. A simple set of instructions would enable the installation of a stationary module and the re-wiring of the equipment to input the same alerting signal(s) to the stationary module. This would enable the invention to be applied to equipment not necessarily produced by the inventor. Future equipment produced by the inventor would typically have the means to add the stationary module with a simple plug type connection for field add-on.

An improved method of servicing an automotive vehicle of the invention using an automotive service machine having at least one automatic mode of operation during which an operator is not required to be present, comprises initiating an automatic mode of operation of the automatic service machine for servicing a vehicle, indicating by the machine to a first, stationary communication module connected to the machine, the status of the automatic mode of operation of the machine, interpreting the indicating by the machine to the first communication module and wirelessly transmitting signals from the first communication module when an operator's attention to the machine is required, remotely receiving the signals at a second, portable communication module, and signaling by a signaling device in the second communication module that an operator's attention to the machine is required in response to the receipt of the signals by the second communication module. This signaling in an example embodiment includes turning on an indicator light, sounding an audible buzzer and activating a vibrator of the second communication module. Signaling could be by way of text messaging.

These and other objects, features and advantages of the invention will be more apparent from the following detailed description taken with the accompanying drawings.

BRIEF DESCRIPTION OF DRAWINGS

FIG. 2A is a view from the front of a portable module of the automotive service equipment of FIG. 1.

FIG. 2B is a view from the back of the portable module of FIG. 2A.

FIG. 2C is a sectional view of the portable module of FIGS. 2A and 2B taken along the line II-II in FIG. 2B.

DETAILED DESCRIPTION

Figure 1:
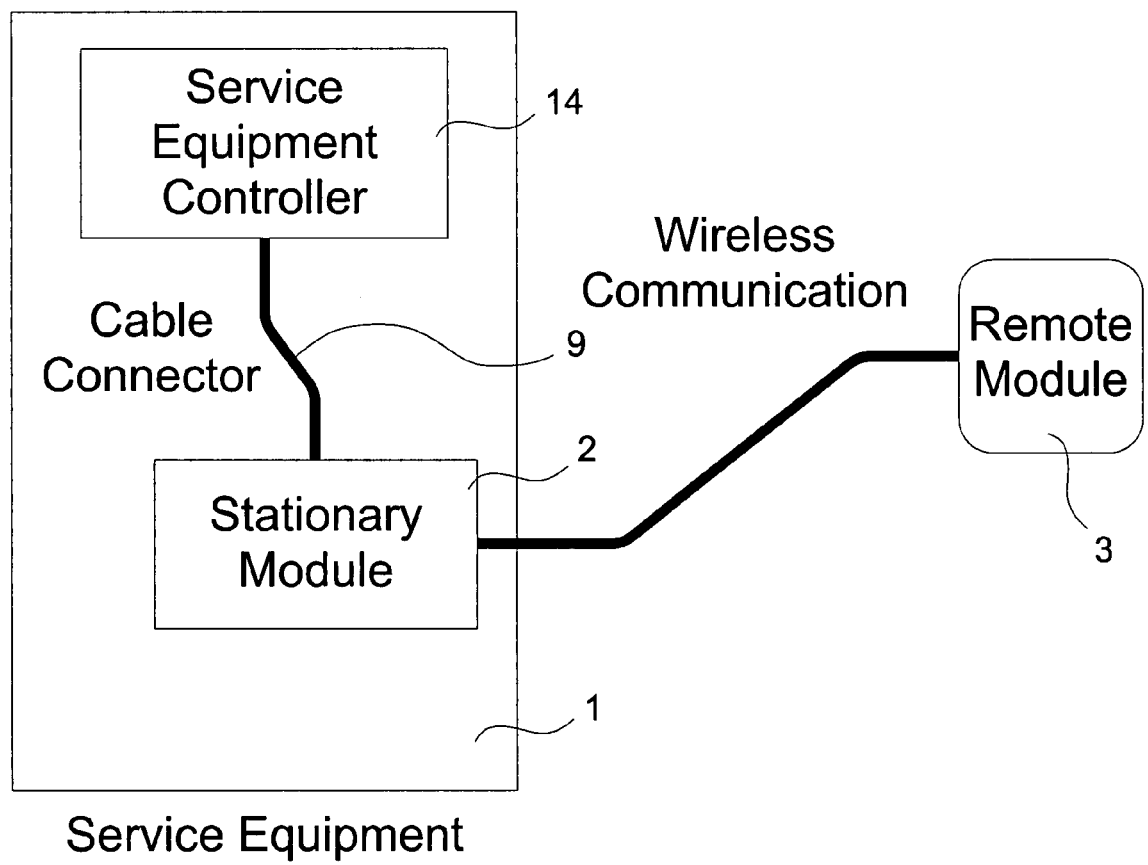
FIG. 1 is a block diagram of an embodiment of the automotive service equipment or system of the invention which includes an automotive service machine, labeled Service Equipment, having at least one automatic mode of operation for servicing a vehicle, and a portable, remote module.

Referring now to the drawings, an automotive service equipment or system of the example embodiment of the invention illustrated in the drawings includes an automotive service machine 1 having at least one automatic mode of operation for servicing a vehicle during which an operator is not required to be present. The machine 1 has a digital electronic controller 14 for the operation of the machine when servicing a vehicle in the at least one automatic mode of operation. Electrical outputs from the controller control the machine based on logic software of a programmed processor such as a microprocessor of the controller.

Well known power/ground connections to ICs and other components may not be shown within the FIGS. for simplicity of illustration and discussion, and so as not to obscure the invention. Arrangements may be shown in block diagram form in order to avoid obscuring the invention, and signals (e.g., wireless signals) may be shown in simplistic line form, and also in view of the fact that specifics with respect to implementation of such block diagram and signal arrangements are highly dependent upon the platform within which the present invention is to be implemented, i.e., such specifics should be well within purview of one skilled in the art. In other instances, detailed descriptions of well-known methods and components are omitted so as not to obscure the description of the invention with unnecessary/excessive detail. Where specific details (e.g., circuits, flowcharts) are set forth in order to describe example embodiments of the invention, it should be apparent to one skilled in the art that the invention can be practiced without, or with variation of, these specific details. Finally, it should be apparent that differing combinations of hard-wired circuitry and software instructions can be used to implement embodiments of the present invention, i.e., the present invention is not limited to any specific combination of hardware and software.

The machine 1 in the example embodiment is an automatic nitrogen tire filling machine as described in a commonly owned U.S. patent application Ser. No. 11/797,193, concurrently filed with the present application and hereby incorporated by reference. However, the automotive service machine of the present invention is not limited to the nitrogen tire filling machine in the referenced application but could be another automotive service machine having at least one automatic mode of operation for servicing a vehicle during which an operator is not required to be present. In such machines, typically a controller of the machine performs a plurality of process steps automatically, sequentially, each step requiring various lengths of time for completion with the operator not being required to be present during these periods of time. Examples of other automotive service machines for use in the invention include fluid handling machines for power steering fluid exchange, differential fluid exchange, engine oil system flush, engine coolant exchange, air conditioner refrigerant charging/recovery/recycling, air conditioner flush, transmission fluid handling, and brake fluid exchange. Other automotive service machines could also be employed.

The automotive service equipment in the illustrated embodiment further comprises a first, stationary communication module 2 connected to the automotive service machine 1. The stationary module is mounted within the automotive service machine. The stationary module can be embedded within the controller 14 or installed as a separate modular unit. In the drawings, the stationary module is shown installed as a separate modular unit having a cable 9 with a unique plug connector 8 for attachment to the controller 14. The controller has a communication port, receptacle 7 in FIG. 3, keyed to accept the plug connector 8.

Unique signals are generated by the controller 14 indicating the status of an automatic mode of operation of the machine. These signals are interpreted by the controller and transmitted to the stationary module 2. The stationary module interprets each signal and then transmits a unique signal via wireless technology for communicating when an operator's attention to the machine is required. For example, the wirelessly transmitted signals from the stationary communication module communicate when there has been completion of selected sequences by the machine, or a process is halted due to an operation fault condition, or a process input is required. In the example embodiment, the machine 1 with communication port 7 on the controller will operate in a normal mode if the stationary module 2 is not integrated or connected to the controller. The operator may also choose to not use the remote monitoring capability of the automotive service equipment while performing a service procedure by not activating the stationary module connected to the controller in the manner discussed below.

The automotive service equipment further includes a portable communication module 3, which is preferably a pocket-sized module for carrying by an operator. It has provisions for a lanyard which can be worn around the neck, a belt clip or key chain as depicted in FIGS. 2A and 2B. The module is battery operated, batteries 15 being shown in FIG. 2C. Batteries can be of the rechargeable type. Means could be provided to dock the portable module for automatic recharging of the batteries while the portable module is not in use. The module receives the wirelessly transmitted signals from the stationary module 2 and in response activates a signaling device in the remote module signaling an operator that attention to the machine is required. The signaling device in the module of the example embodiment includes LED indicator lights 13, FIGS. 2A and 3, as well as an audible buzzer (not shown) and a vibrator (not shown) The small portable module 3 is a self contained unit with a liquid crystal display screen 11 and also a power switch 12. Other configurations for the remote module could be employed.

The range of communication between the stationary module 2 of the machine and the remote module 3 is preferably equal to or greater than the size of the workshop in which the automotive service equipment of the invention is to be used. The maximum range in the embodiment is 100 feet, but if a shop was 300 feet long, for example, the signal to the remote module from the stationary module can be transmitted wireless node-to-node by putting a node (electronic module) at 100 feet and another one at 200 feet away from the machine with stationary communication module so that the remote portable communication module will receive a signal at 300 feet. That is, the stationary module would transmit to node 1, node 1 would transmit to node 2 and node 2 would transmit to the remote portable communication module. This permits the operator to move freely about the workshop for performing other tasks within the workshop during an automatic mode of operation of the machine. Several remote modules can be made to be used in a workshop; each carried by different operators. Each remote module can be programmed to synchronize with only one specific machine.

Figure 3:
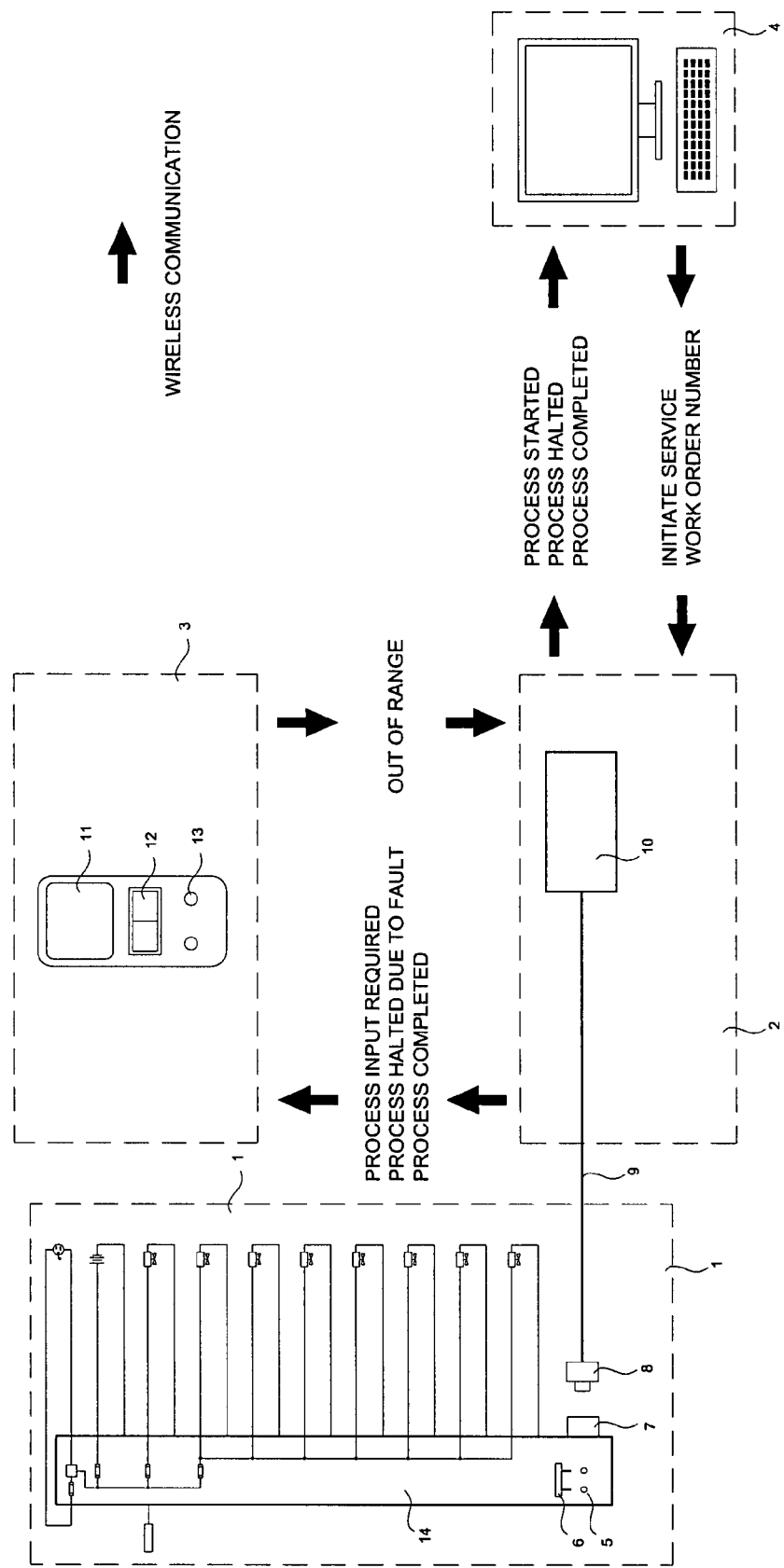
FIG. 3 is an electrical schematic diagram of the automotive service equipment of FIG. 1 and an optional workshop management computer system.

The stationary module 2 of the automotive service equipment can also optionally communicate with a central monitoring station to facilitate workshop management. An optional workshop management computer system 4 for this purpose is depicted in FIG. 3. The first communication module wirelessly transmits signals to and receives wirelessly transmitted signals from the workshop management computer system. Examples of information communicated to the workshop management computer system are Process Started, Process Halted, and Process Completed as shown in FIG. 3. Examples of information from the computer system 4 to the first communication module are Initiate Service and Work Order Number.

It is recognized that a typical workshop may have several unique pieces of service equipment which can simultaneously operate in an automatic mode. The automotive service equipment of the invention can include a plurality of automotive service machines each having at least one automatic mode of operation for servicing a vehicle during which an operator is not required to be present. A plurality of first communication modules are connected to respective one of the automotive service machines for receiving signals from the machine indicating the status of an automatic mode of operation of the machine and for wirelessly transmitting signals when an operator's attention to the machine is required. One portable communication module 3 can be used to receive the signals from each of the stationary communication modules and in response activate the signaling device in the remote module for signaling an operator that attention to the machine is required. Thus, one remote module can alert the operator of the individual status of several unique pieces of equipment operating simultaneously in an automatic mode.

FIG. 3 shows communication of components of the automotive service equipment of the example embodiment. The equipment or system consists of four modules: electronic controls of the automotive service machine, stationary communication module 2, portable communication module 3 and optionally the workshop management computer system 4.

The controller of the machine 1 has a socket 5 and mating jumper plug 6. Insertion of the plug into the socket initiates communication at receptacle 7. This provides a means permitting the operator to selectively activate/deactivate the first communication module at the machine without disconnecting the plug connector 8 from the controller. The module 2 is an enclosed electronic circuit 10 with wireless communication ability. This would include a wireless transmitter and a wireless receiver coupled to a suitable antenna or other transmission medium coupler as will be readily understood by the skilled artisan. Similar components are provided in the portable communication module 3 and the computer system 4. The transmitters and receivers may be either radio frequency (RF) or infrared (IR) devices, but they are of the same type.

The stationary module 2 communicates signals wirelessly as shown in FIG. 3. Signals broadcast by the stationary module to the portable module 3 may be (but not limited to) the following: Process Input Required, Process Halted Due To Fault or Process Complete, as shown in FIG. 3. The portable module 3 can also communicate signals wirelessly to the stationary module 2. A signal indicating that the portable module is Out Of Range is an example. A further embodiment is a technique whereby one-way communication from the stationary module to the portable module will accomplish the Out Of Range alert function at the portable module. A periodic signal from the stationary module would initiate a timing circuit in the portable module. At the end of this brief time period, the portable module would alert the technician that he must be out of range. As long as the portable module remains within range, the pulsating signals would be received to continuously reset the timer and not cause an Out Of Range alert.

From the above, it can be seen that a method of the invention for servicing an automotive vehicle using an automotive service machine having at least one automatic mode of operation during which an operator is not required to be present, comprises initiating an automatic mode of operation of the automatic service machine for servicing a vehicle. In the example embodiment, the nitrogen tire filling machine 1 would be set up with hoses connecting the machine to vehicle tires to be filled as described in detail in assignee's aforementioned application. Following a setup procedure at the machine by the operator, the machine could be placed in one of several automatic modes of operation, for example, a mode of operation for filling four tires automatically. Once the automatic mode of operation has been initiated, according to the present invention the machine indicates to the stationary communication module connected to the machine the status of the automatic mode of operation of the machine. These indications are interpreted by the machine and the stationary communication module wirelessly transmits signals when an operator's attention to the machine is required. The signals are remotely received at the portable communication module 3. The remote module signaling device is operated to alert an operator that attention to the machine is required in response to the receipt of the signals. This is done in the disclosed embodiment via the three signaling modes of indicator lights, audible buzzer and a vibrator, but other signal devices and methods, such as text messaging, could be employed. Thus, with the method of the invention the operator is not required to be present at the automotive service machine during the automatic mode of operation. He can be performing other tasks within the workshop, thus being more productive and efficient.

At least a portion (if not all) of the present invention may be practiced as a software invention, implemented in the form of one or more machine-readable medium having stored thereon at least one sequence of instructions that, when executed, causes a machine to effect operations with respect to the invention. With respect to the term "machine", such term should be construed broadly as encompassing all types of machines, e.g., a non-exhaustive listing including: computing machines, non-computing machines, communication machines, etc. With regard to the term "one or more machine-readable medium", the sequence of instructions may be embodied on and provided from a single medium, or alternatively, differing ones or portions of the instructions may be embodied on and provided from differing and/or distributed mediums. A "machine-readable medium" includes any mechanism that provides (i.e., stores and/or transmits) information in a form readable by a machine (e.g., a processor, computer, electronic device). Such "machine-readable medium" term should be broadly interpreted as encompassing a broad spectrum of mediums, e.g., a non-exhaustive listing including: electronic medium (read-only memories (ROM), random access memories (RAM), flash cards); magnetic medium (floppy disks, hard disks, magnetic tape, etc.); optical medium (CD-ROMs, DVD-ROMs, etc); electrical, optical, acoustical or other form of propagated signals (e.g., carrier waves, infrared signals, digital signals); etc.

While we have shown and described a preferred embodiment in accordance with the present invention, it is understood that the invention is not limited thereto but is subject to numerous modifications and variations which will be apparent to the skilled artisan. As an additional feature, the remote module can have other features such as a flashlight or a voice memo recorder. Thus, the above description of an example embodiment is not intended to be limiting. All such modifications coming within the scope of the appended claims are intended to be included therein.

We claim:

1. Automotive service equipment comprising:
   an automotive service machine having at least one automatic mode of operation for servicing a vehicle during which an operator is not required to be present;
   a first, stationary communication module connected to the automotive service machine, the machine generating and sending to the first communication module first signals indicating the status of an automatic mode of operation of the machine and the first communication module interpreting said first signals and wirelessly transmitting second signals communicating when an operator's attention to the machine is required;
   a second, portable communication module which remotely receives the second signals and in response activates a signaling device in the second communication module for signaling an operator that attention to the machine is required.

2. The automotive service equipment according to claim 1, wherein the second signals are wirelessly transmitted by the first communication module when at least one of a process input is required, a process is halted due to an operation fault condition, and a process is completed.

3. The automotive service equipment according to claim 1, wherein the automotive service machine includes a controller for operating the machine in at least one automatic mode of operation and for sending the first signals from the machine to the first communication module, and wherein the first communication module is embedded within the controller.

4. The automatic service equipment according to claim 1, wherein the automotive service machine includes a controller for operating the machine in the at least one automatic mode of operation and for sending the first signals from the machine to the first communication module, and wherein the first communication module is installed in the machine as a separate modular unit via a cable with plug connector at a communication port of the controller.

5. The automotive service equipment according to claim 1, further comprising a workshop management computer system, the first communication module wirelessly transmitting signals to and receiving wirelessly transmitted signals from the workshop management computer system.

6. The automotive service equipment according to claim 5, wherein signals are wirelessly transmitted by the first communication module to the workshop management computer system when at least one of a process is started, a process is halted, and a process is completed.

7. The automotive service equipment according to claim 6, wherein signals are wirelessly transmitted from the workshop management computer system to the first communication module to indicate at least one of initiate service and work order number.

8. The automotive service equipment according to claim 1, wherein the second, portable communication module is a pocket-sized module for carrying by an operator.

9. The automotive service equipment according to claim 1, including a plurality of automotive service machines each having at least one automatic mode of operation for servicing a vehicle during which an operator is not required to be present, and a plurality of first communication modules each connected to a respective one of the automotive service machines for receiving first signals from the machine indicating the status of an automatic mode of operation of the machine and wirelessly transmitting second signals when an operator's attention to the machine is required, and wherein the second, portable communication module receives the second signals from each of the first communication modules and in response activates a signaling device in the second communication module for signaling an operator that attention to the machine is required.

10. The automotive service equipment according to claim 9, wherein the plurality of automotive service machines include different types of automotive service fluid handling machines selected from the group consisting of machines for:
   power steering fluid exchange,
   differential fluid exchange,
   engine oil system flush,
   engine coolant exchange,
   air conditioner refrigerant charging/recovery/recycling,
   air conditioner flush,
   transmission fluid handling,
   brake fluid exchange, and
   nitrogen tire filling.

11. The automotive service equipment according to claim 1, including means permitting the operator to selectively activate the first communication module at the machine.

12. The automotive service equipment according to claim 1, wherein the signaling device in the second, portable communication module includes at least one of an indicator light, an audible buzzer and a vibrator for signaling an operator.

13. The automotive service equipment according to claim 1, wherein one of the first communication module and the second, portable communication module wirelessly transmits third signals to the other for indicating that the second, portable communication module is out of range.

14. A method of servicing an automotive vehicle using an automotive service machine having at least one automatic mode of operation during which an operator is not required to be present, the method comprising:

initiating an automatic mode of operation of the automatic service machine for servicing a vehicle;

indicating by first signals from the machine to a first, stationary communication module connected to the machine, the status of the automatic mode of operation of the machine;

interpreting the first signals from the machine to the first communication module and wirelessly transmitting second signals from the first communication module when an operator's attention to the machine is required;

remotely receiving the second signals at a second, portable communication module;

signaling by a signaling device in the second communication module that an operator's attention to the machine is required in response to the receipt of the second signals by the second communication module.

15. The method according to claim 14, further comprising the first communication module wirelessly communicating with a workshop management computer system.

16. The method according to claim 14, wherein the signaling that an operator's attention to the machine is required takes place when at least one of a process input is required, a process is halted due to an operation fault condition, and a process is completed.

17. The method according to claim 14, including the second, portable communication module receiving wirelessly transmitted signals from each of a plurality of first communication modules connected to respective ones of a plurality automotive service machines each having at least one automatic mode of operation.

18. The method according to claim 17, wherein the plurality of automotive service machines include different types of automotive service fluid handling machines selected from the group consisting of machines for:

power steering fluid exchange,
  differential fluid exchange,
  engine oil system flush,
  engine coolant exchange,
  air conditioner refrigerant charging/recovery/recycling,
  air conditioner flush,
  transmission fluid handling,
  brake fluid exchange, and
  nitrogen tire filling.

19. The method according to claim 14, including selectively activating the first communication module at the machine for performing the method.

20. The method according to claim 14, wherein the signaling device includes at least one of an indicator light, an audible buzzer and a vibrator.

21. The method according to claim 14, including wirelessly transmitting signals from one of the first communication module and the second portable communication module to the other of said first communication module and said second portable communication module for indicating that the second, portable communication module is out of range.

* * * * *